United States Patent
Son

(10) Patent No.: US 9,325,020 B2
(45) Date of Patent: Apr. 26, 2016

(54) METHOD OF OPERATING FUEL CELL SYSTEM

(71) Applicant: Hyundai Motor Company, Seoul (KR)

(72) Inventor: Ik Jae Son, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 405 days.

(21) Appl. No.: 13/907,328

(22) Filed: May 31, 2013

(65) Prior Publication Data

US 2014/0186735 A1    Jul. 3, 2014

(30) Foreign Application Priority Data

Dec. 28, 2012  (KR) .................. 10-2012-0157490

(51) Int. Cl.
| | |
|---|---|
| *H01M 8/04* | (2006.01) |
| *H01M 8/02* | (2006.01) |
| *H01M 8/10* | (2016.01) |

(52) U.S. Cl.
CPC ........ *H01M 8/04552* (2013.01); *H01M 8/0491* (2013.01); *H01M 8/04388* (2013.01); *H01M 8/04492* (2013.01); *H01M 8/04529* (2013.01); *H01M 2008/1095* (2013.01); *Y02E 60/50* (2013.01)

(58) Field of Classification Search
CPC ............ H01M 8/04552; H01M 8/04753; H01M 8/04992; H01M 8/04156; H01M 8/04268; H01M 8/0432; H01M 8/04388; H01M 8/04395; H01M 8/04492
See application file for complete search history.

(56) References Cited

U.S. PATENT DOCUMENTS

| | | | | |
|---|---|---|---|---|
| 2003/0022037 A1* | 1/2003 | Parr | .............. | H01M 8/04223 429/429 |
| 2004/0245100 A1* | 12/2004 | Abouatallah | .......... | C25B 15/06 204/400 |
| 2005/0233188 A1* | 10/2005 | Kurashima | ........ | H01M 8/04089 429/411 |
| 2006/0093880 A1* | 5/2006 | Igarashi | ............ | H01M 8/04328 429/429 |
| 2006/0292011 A1* | 12/2006 | Jang | .................. | H01M 8/04082 417/22 |
| 2007/0212579 A1* | 9/2007 | Takada | .............. | H01M 8/04007 429/431 |
| 2012/0148927 A1* | 6/2012 | Jeon | .................. | H01M 8/04992 429/414 |

FOREIGN PATENT DOCUMENTS

| | | |
|---|---|---|
| JP | 2004-311149 A | 11/2004 |
| JP | 4380231 B2 | 12/2009 |
| JP | 2012-160336 A | 8/2012 |
| KR | 10-2012-0064204 A | 6/2012 |

* cited by examiner

*Primary Examiner* — Kenneth Douyette
(74) *Attorney, Agent, or Firm* — McDermott Will & Emery LLP

(57) ABSTRACT

A method of operating a fuel cell system includes calculating voltages that are generated in each cell of a stack. It is determined whether the voltages satisfy a voltage stability condition. When it is determined that the voltages satisfy the voltage stability condition, it is determined whether a moisture balance condition and a hydrogen supply condition are satisfied. When it is determined that the moisture balance condition and the hydrogen supply condition are satisfied, the voltage stability condition is relieved and reset. It is determined whether the voltages that are generated in each cell of the stack satisfy the reset voltage stability condition. When it is determined that the voltages that are generated in each cell of the stack satisfy the reset voltage stability condition, the stack is normally operated.

9 Claims, 5 Drawing Sheets

METHOD OF OPERATING FUEL CELL SYSTEM

CROSS-REFERENCE TO RELATED APPLICATION

This application claims benefit of priority to Korean Patent Application No. 10-2012-0157490 filed in the Korean Intellectual Property Office on Dec. 28, 2012, the entire contents of which are incorporated herein by reference.

TECHNICAL FIELD

The present inventive concept relates to a method of operating a fuel cell system that generates electrical energy by receiving air to an air electrode (cathode) and receiving hydrogen to a fuel electrode (anode) and by chemically reacting the air and the hydrogen with each other.

BACKGROUND

In general, a fuel cell vehicle in which a fuel cell system is mounted generates electricity by supplying hydrogen used as fuel to a fuel cell stack and is driven by operating an electric motor with the electricity that is generated by the fuel cell stack.

Here, the fuel cell system is a kind of generation system that directly electrochemically converts chemical energy of fuel to electrical energy within a fuel cell stack instead of changing to a heat by combustion.

In such a fuel cell system, hydrogen having high purity is supplied from a hydrogen storage tank to an anode of a fuel cell, and air of the atmosphere is directly supplied to a cathode of the fuel cell using an air supply apparatus such as an air blower.

Accordingly, the hydrogen that is supplied to the fuel cell stack is separated into protons and electrons at a catalyst of the anode, and the separated protons are moved to the cathode through a polymer electrolyte membrane, and oxygen that is supplied to the cathode is coupled to electrons that are moved to the cathode through an external leading wire, and thus while water is generated, electrical energy is generated.

At the anode of the fuel cell, there exist unreacted hydrogen and moisture that moves from the cathode exhaust condensed water. The unreacted hydrogen is supplied to the fuel cell stack through a hydrogen recirculation device, and the condensed water is stored at a watertrap and is exhausted to the outside.

When the unreacted hydrogen is recirculated, in order to remove a foreign substance that is generated at the anode of the fuel cell stack, the fuel cell system purges hydrogen.

In the fuel cell system, when a gas or a coolant is not normally distributed, a performance of a specific cell is deteriorated and thus the specific cell may be degraded, and in order to prevent this, a current limitation function is applied.

Further, when the performance of a specific cell is deteriorated, a foreign substance such as hydrogen and moisture is purged through a purge valve, and by increasing a rotation speed of a hydrogen blower and an air blower, the performance of the cell may be recovered.

However, operation that increases a rotation speed of the blower and that exhausts the foreign substance, increases consumption of entire electrical energy and increases entire fuel consumption of a vehicle.

The above information disclosed in this Background section is only for enhancement of understanding of the background of the inventive concept and therefore it may contain information that does not form the prior art.

SUMMARY

The present inventive concept has been made in an effort to provide a method of operating a fuel cell system having advantages of increasing efficiency of an entire fuel cell by reducing operation power that is consumed in a stack itself even if a performance of a specific cell is deteriorated.

An aspect of the present inventive concept relates to a method of operating a fuel cell system including calculating voltages that are generated in each cell of a stack. It is determined whether the voltages satisfy a voltage stability condition. When it is determined that the voltages do not satisfy a voltage stability condition, it is determined whether a moisture balance condition and a hydrogen supply condition are satisfied. When it is determined that the moisture balance condition and the hydrogen supply condition are satisfied, the voltage stability condition are relieved and reset. It is determined whether the voltages that are generated in each cell of the stack satisfy the reset voltage stability condition. When it is determined that the voltages that are generated in each cell of the stack satisfy the reset voltage stability condition, the stack is normally operated.

The method may further include limiting, when it is determined that the voltages that are generated in each cell of the stack do not satisfy the reset voltage stability condition, an output current by abnormally operating the stack.

An average value of the voltages that are generated in each cell of the stack may be calculated, and a minimum value may be selected. It may be determined whether a value that is obtained by dividing the minimum value by the average value is equal to or lager than a predetermined value. When it is determined that the value that is obtained by dividing the minimum value by the average value is equal to or lager than the predetermined value, it may be determined that the voltage stability condition is satisfied.

It may be determined that the voltage stability condition is not satisfied, when it is determined that the value that is obtained by dividing the minimum value by the average value is less than the predetermined value.

The moisture balance condition may be determined using an open cycle of a condensation water purge valve of a hydrogen electrode.

The hydrogen supply condition may be determined using a rotation speed and a supply pressure of a hydrogen blower that supplies hydrogen.

The hydrogen supply condition may be determined based on a cycle of hydrogen purge.

It may be determined whether the open cycle is in a predetermined range. When it is determined that the open cycle is in the predetermined range, it may be determined that the moisture balance condition is satisfied.

It may be determined whether a rotation speed and a supply pressure of the hydrogen blower are in a predetermined range. When it is determined that the rotation speed and the supply pressure of the hydrogen blower are in the predetermined range, it may be determined that the hydrogen supply condition is satisfied.

It may be determined whether the purge cycle is in a predetermined range. When it is determined that the purge cycle is in the predetermined range, it may be determined that the hydrogen supply condition is satisfied.

As described above, in a method of operating a fuel cell system according to an aspect of the present inventive concept, even if a voltage drops at a specific cell of a stack, when hydrogen is stably supplied and water balance is stably maintained, by normally operating the stack, operating power of the stack can be reduced and generation efficiency of the fuel cell can be improved.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION

Figure 1:
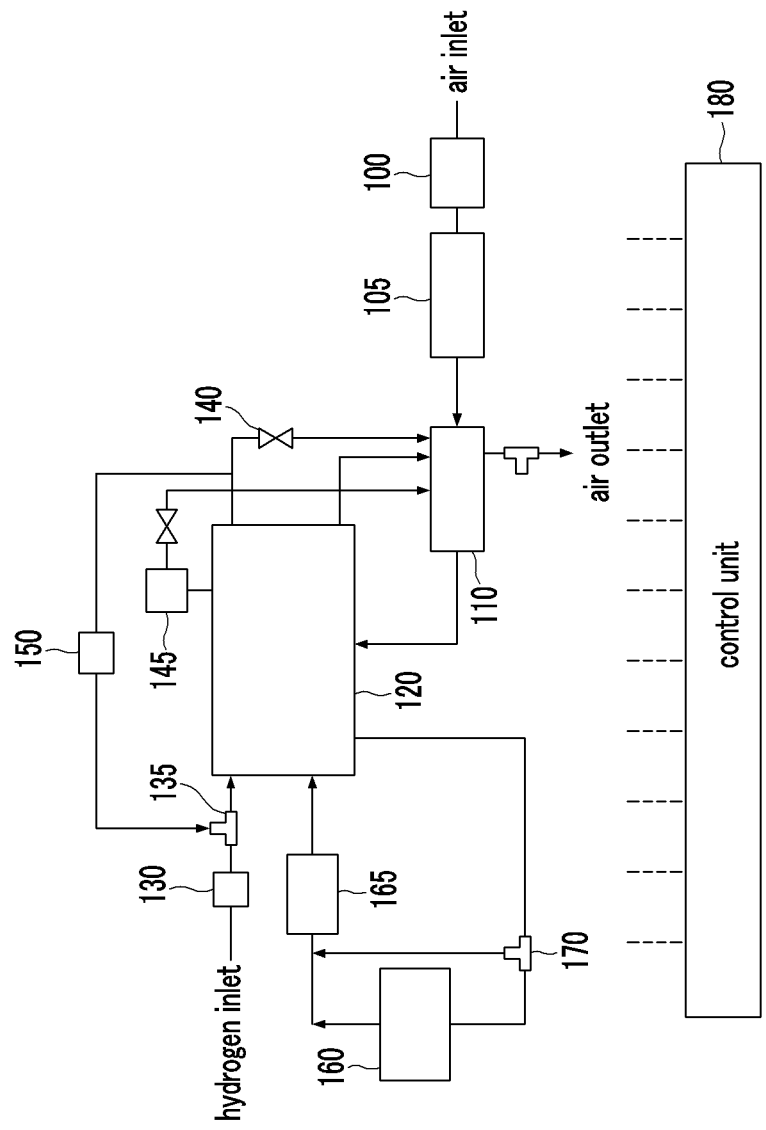
FIG. 1 is a schematic diagram of a fuel cell system.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept. Accordingly, the drawings and description are to be regarded as illustrative in nature and not restrictive. Like reference numerals designate like elements throughout the specification.

An exemplary embodiment of the present inventive concept will hereinafter be described in detail with reference to the accompanying drawings.

FIG. 1 is a schematic diagram of a fuel cell system.

Referring to FIG. 1, the fuel cell system may include a stack 120, a filter 100, an air blower 105, a humidifier 110, a proportional control valve 130, an ejector 135, a recirculation valve 150, a purge valve 140, a watertrap 145, a radiator 160, a water pump 165, an opening degree adjustment valve 170, and a control unit 180.

The control unit 180 may control constituent elements, e.g., the stack 120, the filter 100, the air blower 105, the humidifier 110, the proportional control valve 130, the ejector 135, the recirculation valve 150, the purge valve 140, the watertrap 145, the radiator 160, the water pump 165, and the opening degree adjustment valve 170, and generate electricity by controlling hydrogen and oxygen that are supplied to an anode and a cathode of the stack 120. Here, an internal detailed structure of the stack 120 is well-known technology and therefore a detailed description thereof will be omitted.

In a state in which the stack 120 is operated in a low temperature (35° C. or less), as moisture is generated at a separation plate (not separately shown) of the anode, a hydrogen shortage phenomenon may partially occur, a carrier of the anode may be corroded, and a carrier of the cathode may be corroded by oxygen that is moved to the anode.

However, in a condition in which hydrogen is normally supplied, when air is insufficient, by a hydrogen pump function, a hydrogen concentration of the air outlet side (see FIG. 1) may increase and degradation may not occur. Here, a hydrogen pump function of the stack 120 is well-known technology and therefore a detailed description thereof will be omitted.

Figure 2:
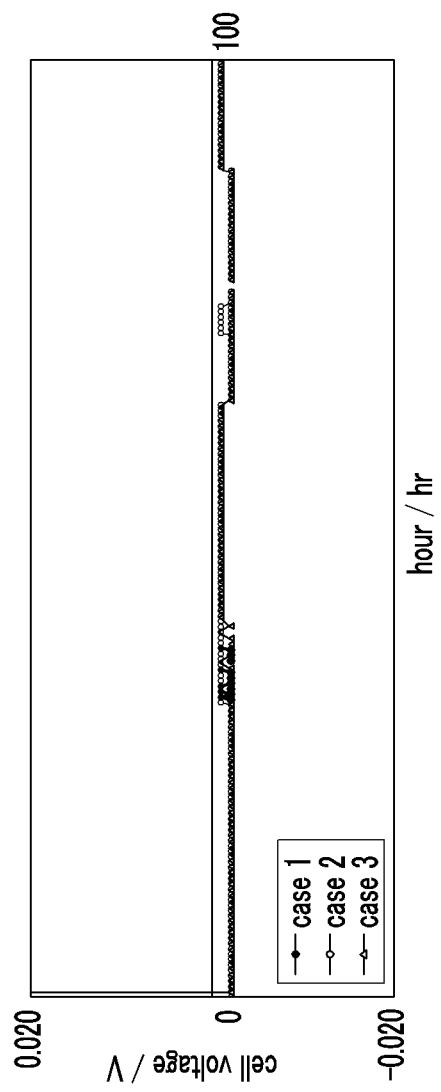
FIG. 2 is a graph illustrating a voltage of a cell over time by a hydrogen pump function according to an exemplary embodiment of the present inventive concept.
Figure 3:
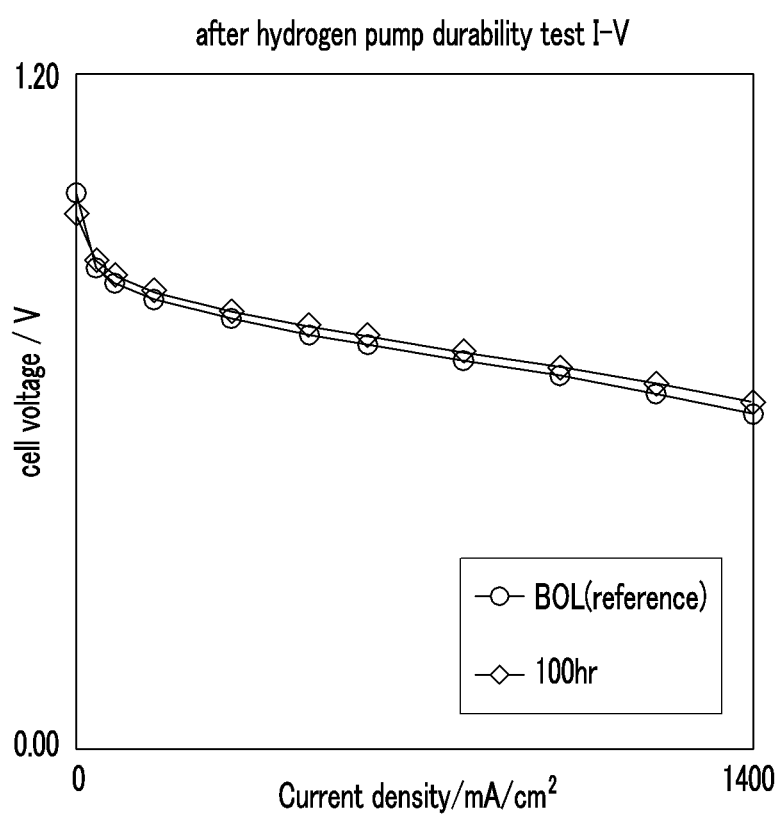
FIG. 3 is a graph illustrating a voltage of a cell versus a current density by a hydrogen pump function according to an exemplary embodiment of the present inventive concept.

FIG. 2 is a graph illustrating a voltage of a cell over time by a hydrogen pump function according to an exemplary embodiment of the present inventive concept, and FIG. 3 is a graph illustrating a voltage of a cell versus a current density by a hydrogen pump function according to an exemplary embodiment of the present inventive concept.

Referring to FIG. 2, a horizontal axis represents time, and a vertical axis represents voltage of a cell.

While the stack operated, a voltage of a cell was not dropped at each of case 1, case 2, and case 3 as an exemplary embodiment.

Further, referring to FIG. 3, the horizontal axis represents current density, and the vertical axis represents voltage of a cell. As shown in FIG. 3, voltage of a cell that is operated for 100 hours was not deteriorated based on a reference cell.

That is, in a state in which hydrogen is normally supplied and air is poorly supplied, a hydrogen concentration of the air outlet side increases and a voltage drop due to degradation does not occur by a hydrogen pump function between the anode and the cathode.

Figure 4:
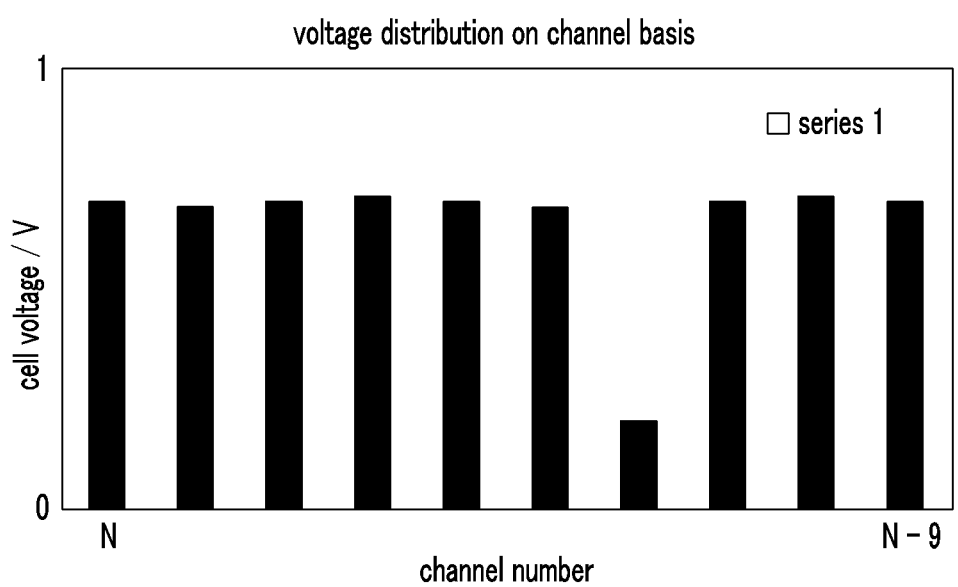
FIG. 4 is a graph illustrating a voltage drop of a specific cell according to an exemplary embodiment of the present inventive concept.

FIG. 4 is a graph illustrating a voltage drop of a specific cell according to an exemplary embodiment of the present inventive concept.

Referring to FIG. 4, the horizontal axis represents channel number of a cell, and the vertical axis represents voltage of the cell. As shown in FIG. 4, a voltage drop phenomenon occurs in which a low voltage is output at a specific cell.

Figure 5:
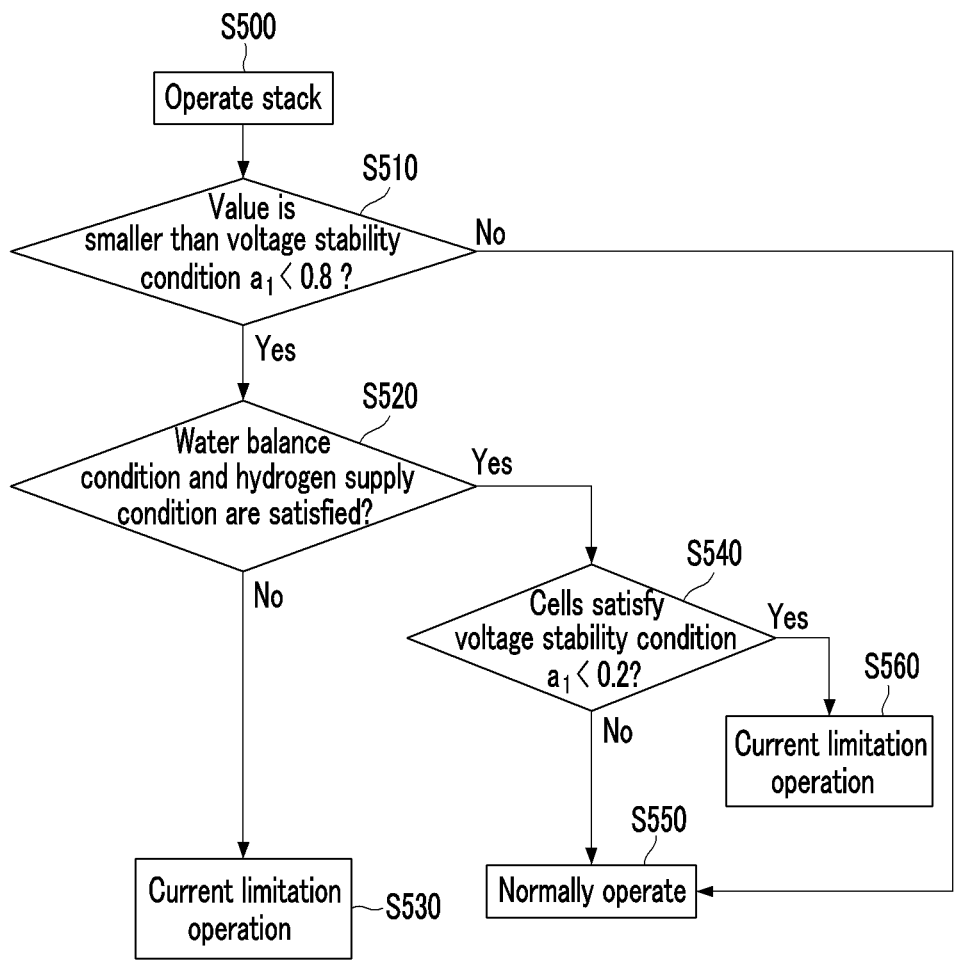
FIG. 5 is a flowchart illustrating a method of operating a fuel cell system according to an exemplary embodiment of the present inventive concept.

FIG. 5 is a flowchart illustrating a method of operating a fuel cell system according to an exemplary embodiment of the present inventive concept.

Referring to FIG. 5, the stack 120 may be normally operated (S500). The control unit 180 may determine whether cells of the stack 120 satisfy a voltage stability reference (S510).

In more detail, the control unit 180 may sense a voltage that is generated in each cell of the stack 120, calculate an average value of the sensed voltage values, and select a minimum value thereof. The control unit 180 may divide the minimum value by the average value. The control unit 180 determines whether a value that is obtained by dividing the minimum value by the average value is smaller than a predetermined voltage stability reference (e.g., 0.8).

If the control unit determines that a value that is obtained by dividing the minimum value by the average value is smaller than a predetermined voltage stability reference, the control unit 180 may perform step S520. If the control unit determines that the value that is obtained by dividing the minimum value by the average value is equal to or larger than the predetermined voltage stability reference, the stack may be normally operated (S550).

The control unit 180 may determine whether a water balance condition and a hydrogen supply condition are satisfied (S520). If the control unit 180 determines that the water balance condition and the hydrogen supply condition are satisfied, the control unit 180 may perform step S540. If the control unit 180 determines that at least one of the water balance condition and the hydrogen supply condition is not satisfied, the control unit 180 may perform step S530.

The water balance condition may be an open cycle and an open time of the purge valve 140 corresponding to the anode of the stack 120, and the control unit 180 may determine whether the open cycle or the open time of the purge valve 140 satisfies a predetermined value.

A purge cycle of the purge valve in the water balance condition may be obtained by multiplying an open cycle of the valve by an added value in which a weight is given based on a charge amount and by multiplying an open time of the valve by the added value. A purge cycle may be set based on the number of times of opening the valve. A purge cycle may be calculated based on a cumulative operation time.

The hydrogen supply condition may be determined using a rotation speed and a supply pressure of a hydrogen blower (not separately shown) that supplies hydrogen to the stack 120 based on an output current (e.g., charge amount). That is, it may be determined whether a supply pressure satisfies a predetermined value, or it may be determined whether a rotation speed of the hydrogen blower satisfies a predetermined value.

Further, the hydrogen supply condition may be determined based on a purge cycle of the hydrogen purge valve. That is, when the purge cycle of the hydrogen purge valve is in a predetermined range, the hydrogen supply condition may be satisfied. Here, the purge cycle of the hydrogen purge valve may be previously set according to a charge amount (e.g., current*time).

By performing operation that limits an output current of the stack 120 (S530), a cell of the stack may be protected.

It may be determined whether cells of the stack 120 satisfy a voltage stability reference (S540).

In more detail, the control unit 180 may sense a voltage that is generated in each cell of the stack 120, calculate an average value of the sensed voltage values, and select a minimum value thereof. The control unit 180 may divide the minimum value by the average value. The control unit 180 may determine whether a value that is obtained by dividing the minimum value by the average value is smaller than a predetermined voltage stability reference (e.g., 0.2).

If the control unit 180 determines that a value that is obtained by dividing the minimum value by the average value is smaller than a predetermined voltage stability reference, the control unit 180 may perform step S560. If the control unit 180 determines that the value that is obtained by dividing the minimum value by the average value is equal to or larger than a predetermined voltage stability reference, the stack may be normally operated (S550).

By performing operation that limits an output current of the stack 120, the cell of the stack may be protected (S560).

While this inventive concept has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

DESCRIPTION OF SYMBOLS

100: filter 105: air blower
110: humidifier 120: stack
130: proportional control valve 135: ejector
140: purge valve 145: watertrap
150: recirculation valve 160: radiator
165: water pump 170: opening degree adjustment valve
180: control unit

What is claimed is:

1. A method of operating a fuel cell system, comprising:
calculating voltages that are generated in each cell of a stack;
determining whether the voltages satisfy a voltage stability condition;
when it is determined that the voltages do not satisfy the voltage stability condition, determining whether a moisture balance condition and a hydrogen supply condition are satisfied;
when it is determined that the moisture balance condition and the hydrogen supply condition are satisfied, relieving and resetting the voltage stability condition;
determining whether the voltages that are generated in each cell of the stack satisfy the reset voltage stability condition;
when it is determined that the voltages that are generated in each cell of the stack satisfy the reset voltage stability condition, normally operating the stack;
calculating an average value of the voltages that are generated in each cell of the stack;
selecting a minimum value;
determining whether a value that is obtained by dividing the minimum value by the average value is equal to or larger than a predetermined value; and
when it is determined that the value that is obtained by dividing the minimum value by the average value is equal to or larger than the predetermined value, determining that the voltage stability condition is satisfied.

2. The method of claim 1, further comprising:
when it is determined the voltages that are generated in each cell of the stack do not satisfy the reset voltage stability condition, limiting an output current by abnormally operating the stack.

3. The method of claim 1, further comprising:
determining that the voltage stability condition is not satisfied, when it is determined that the value that is obtained by dividing the minimum value by the average value is less than the predetermined value.

4. The method of claim 1, further comprising:
determining the moisture balance condition using an open cycle of a condensation water purge valve of a hydrogen electrode.

5. The method of claim 1, further comprising:
determining the hydrogen supply condition using a rotation speed and a supply pressure of a hydrogen blower that supplies hydrogen.

6. The method of claim 1, further comprising:
determining the hydrogen supply condition based on a cycle of hydrogen purge.

7. The method of claim 4, further comprising:
determining whether the open cycle is in a predetermined range;
when it is determined that the open cycle is in the predetermined range, determining that the moisture balance condition is satisfied.

8. The method of claim 5, further comprising:
determining whether the rotation speed and the supply pressure of the hydrogen blower are in a predetermined range;
when it is determined that the rotation speed and the supply pressure of the hydrogen blower are in the predetermined range, determining that the hydrogen supply condition is satisfied.

9. The method of claim 6, further comprising:
   determining whether the purge cycle is in a predetermined range,
   when it is determined that the purge cycle is in the predetermined range, determining that the hydrogen supply condition is satisfied.

* * * * *